United States Patent
Steinmetz et al.

(10) Patent No.: US 6,512,066 B1
(45) Date of Patent: Jan. 28, 2003

(54) PROCESS FOR MAKING CROSSLINKED POLYVINYLPYRROLIDONE WITH LOW SWELL VOLUME

(75) Inventors: Beth M. Steinmetz, Bryn Mawr, PA (US); Robert M. Arrell, Quarryville, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/075,327

(22) Filed: Feb. 14, 2002

(51) Int. Cl.⁷ ................................................ C08F 26/08
(52) U.S. Cl. ...................................... 526/264; 526/173
(58) Field of Search .................. 526/173, 264

(56) References Cited

U.S. PATENT DOCUMENTS 3,277,066 A 10/1966 Grosser et al. ............ 260/88.3
5,286,826 A 2/1994 Shih et al. ................... 526/264

FOREIGN PATENT DOCUMENTS

WO   WO 94/20555   9/1994

*Primary Examiner*—Helen L. Pezzuto
(74) *Attorney, Agent, or Firm*—Jonathan L. Schuchardt

(57) ABSTRACT

A two-step, base-catalyzed process for making crosslinked polyvinylpyrrolidone (PVP-P) having a low swell volume is disclosed. A crosslinker is generated "in situ" in the first step by heating a basic aqueous mixture containing a relatively low concentration of N-vinylpyrrolidone under added inert gas pressure. In a second step, the reactor temperature is reduced to initiate polymerization. The process is a productive way to make PVP-P that is easy to isolate and purify. The polymer has a swell volume less than about 40 mL $H_2O$/10 g polymer, which makes it valuable for beverage clarification.

18 Claims, No Drawings

PROCESS FOR MAKING CROSSLINKED POLYVINYLPYRROLIDONE WITH LOW SWELL VOLUME

FIELD OF THE INVENTION

The invention relates to a process for making crosslinked polyvinylpyrrolidone. In particular, the invention is a productive way to make crosslinked polyvinylpyrrolidone that is easy to isolate and has a low swell volume.

BACKGROUND OF THE INVENTION

Polyvinylpyrrolidones have diverse utility. They are used in polymer films, adhesives, hair and skin-care formulations, pharmaceutical tablet binders and disintegrants, and beverage clarifiers. Polyvinylpyrrolidones are normally produced by free-radical or base-catalyzed polymerization of N-vinylpyrrolidone (NVP). Initiators such as hydrogen peroxide or organic peroxides polymerize NVP to give polymers having relatively low molecular weight and a low degree of crosslinking. These products are commonly known as "PVP K30" and "PVP K90."

In contrast, crosslinked polyvinylpyrrolidone (hereinafter called "crosslinked PVP" or "PVP-P") has a high molecular weight and a high degree of crosslinking. It is produced by base-catalyzed polymerization of NVP. Crosslinked PVP is usually produced by one of two general methods. In one approach, NVP is polymerized in the presence of an added difunctional crosslinker such as divinylimidazolidone. In an alternative method, the crosslinker is generated "in situ" by heating the reaction mixture at 130° C. to 140° C. in an initial stage. The temperature is then reduced to about 100° C. After an "induction period," during which little or no polymerization occurs, the reaction rate increases rapidly, usually accompanied by an exotherm, and polymerization proceeds to completion. Unfortunately, the induction period can last for hours, which hampers productivity. Thus, an important challenge in making crosslinked PVP involves reducing or eliminating the induction period.

In PCT Int. Appl. WO 94/20555, Tseng teaches a process for making highly crosslinked PVP having a swell volume less than about 65 mL $H_2O$/10 g polymer using an in situ-generated crosslinker. By performing the polymerization under an initial gas pressure of at least 2 bars (about 30 psig), Tseng was able to practically eliminate the induction period. Under similar conditions (described in U.S. Pat. No. 3,277,066), but without the added gas pressure, an induction period of 2–3 hours is typically observed.

While eliminating the induction period is valuable, Tseng's process starts with a relatively high concentration of N-vinylpyrrolidone (75–85 wt. %) in the aqueous mixture. Consequently, the resulting crosslinked PVP mixture is highly concentrated, which makes the polymer difficult to isolate. Ideally, a more dilute solution of N-vinylpyrrolidone could be used to facilitate polymer isolation. Moreover, the polymer produced in this process usually has a swell volume of about 50–60 mL $H_2O$/10 g polymer. For some applications, PVP-P having a somewhat lower swell volume (30–40 mL $H_2O$/10 g polymer) is desirable.

U.S. Pat. No. 5,286,826 teaches a two-stage process for making highly crosslinked PVP having a low swell volume. A relatively concentrated aqueous NVP solution (80 wt. %) is heated in the presence of base under low pressure (0–3 psig) to generate an in situ crosslinker. Next, the solution is cooled to about 30° C., and is diluted with water to reduce the NVP concentration to 5–30 wt. %. The mixture is then reheated to 100° C., whereupon polymerization proceeds to give a product having a swell volume of less than 45 mL $H_2O$/10 g polymer. The process is time-consuming because of the need for cooling, diluting with water, and reheating after generating the crosslinker.

Still needed is a productive process for making crosslinked PVP. Preferably, the induction period for making the PVP-P would be minimized or eliminated. A valuable process would operate at relatively low concentrations of N-vinylpyrrolidone to facilitate polymer isolation. Preferably, the process would avoid the need for a water dilution step. Ideally, the process would give crosslinked PVP having a low swell volume.

SUMMARY OF THE INVENTION

The invention is a process for making crosslinked polyvinylpyrrolidone. The process comprises two steps. In a first step, an aqueous mixture that contains from about 65 to about 70 wt. % of N-vinylpyrrolidone and from about 1.5 to about 6.0 mole % of an alkali metal hydroxide (based on the amount of N-vinylpyrrolidone) is heated under added inert gas pressure. This heating step, which generates a crosslinker in situ, occurs in a sealed reactor at a temperature within the range of about 130° C. to about 150° C. at an ultimate reactor pressure of at least about 55 psig. In a second step, the reactor temperature is reduced to a value within the range of about 95° C. to about 105° C. to initiate polymerization.

The two-step process is an easy and productive way to make crosslinked polyvinylpyrrolidone. Applying pressure in the first step effectively reduces or eliminates the induction period. Surprisingly, a relatively dilute aqueous solution of N-vinylpyrrolidone can be used, so the polymer product is exceptionally easy to isolate and purify. The resulting PVP-P has a swell volume less than about 40 mL $H_2O$/10 g polymer, which makes it particularly valuable for beverage clarification.

DETAILED DESCRIPTION OF THE INVENTION

The invention is a two-step process for making crosslinked polyvinylpyrrolidone by base-catalyzed polymerization of N-vinylpyrrolidone. As used herein, "crosslinked polyvinylpyrrolidone," "crosslinked PVP," and "PVP-P" refer to polymers of N-vinylpyrrolidone that are highly crosslinked and insoluble in water. Preferably, N-vinylpyrrolidone is the only monomer used. However, minor amounts (up to about 10 mole %) of other ethylenic monomers, including other N-vinyl monomers, can be included.

Step One: Generation of an "In Situ" Crosslinker.

In the first step, an aqueous mixture that contains N-vinylpyrrolidone (NVP) and an alkali metal hydroxide is heated under added inert gas pressure. The aqueous mixture contains from about 65 to about 70 wt. % of NVP. If the NVP concentration is significantly less than about 65 wt. %, the induction period is too long (see Comparative Example 3, below) or polymerization does not occur (see Comparative Example 4). On the other hand, if the NVP concentration is much greater than about 70 wt. %, the polymer product is too concentrated and is more difficult to isolate and purify. Moreover, when the NVP concentration is as high as 80 wt. %, the swell volume of the polymer is usually significantly greater than 40 mL $H_2O$/10 g polymer (see Comparative Examples 7 and 8).

The aqueous mixture contains an alkali metal hydroxide. Suitable alkali metal hydroxides include sodium hydroxide, lithium hydroxide, potassium hydroxide, cesium hydroxide, and the like. Potassium hydroxide and sodium hydroxide are economical and effective, and are therefore preferred. Sodium hydroxide is particularly preferred.

The amount of alkali metal hydroxide used is within the range of about 1.5 to about 6.0 mole % based on the amount of N-vinylpyrrolidone used. For example, 2.5 mole % of sodium hydroxide would be 0.025 moles of sodium hydroxide for every mole of N-vinylpyrrolidone used. A more preferred range is from about 2.0 to about 4.0 mole %. If the concentration of alkali metal hydroxide is too low, it is often difficult to achieve a swell volume that is less than 40 mL $H_2O$/10 g polymer (see Comparative Example 5). Most preferably, about 2.8 mole % of sodium hydroxide is used.

The reaction temperature in the first step is within the range of about 130° C. to about 150° C., preferably from about 135° C. to about 145° C. Most preferably, the reaction temperature is about 140° C. The reaction mixture is held at this temperature for a time effective to generate "in situ" a difunctional crosslinker mixture, which typically includes mostly ethylidene vinylpyrrolidone (EVP) and a small fraction of ethylidene bis(vinylpyrrolidone) (EBVP). The in situ-generated crosslinkers act as starters for the polymerization, which occurs in step 2. The polymerization is sometimes called "popcorn" polymerization because of the apparition of solid puffs of PVP-P particles as polymerization proceeds.

In the first step, the aqueous mixture is heated under added inert gas pressure in a sealed reactor. Without any added gas pressure, heating the mixture to the desired temperature (about 130–150° C.) generates autogenous reactor pressure of about 50 psig. In the process of the invention, the reactor is pressurized with an inert gas such as nitrogen or argon, preferably to an ultimate pressure (at 130–150° C.) greater than about 55 psig, and more preferably within the range of about 60 psig to about 100 psig. Most preferably, the ultimate reactor pressure is within the range of about 60 psig to about 80 psig. Interestingly, a relatively small increase in the pressure above the reaction mixture provides a significant benefit in reducing or eliminating the induction period. In the absence of added gas pressure, we observed an undesirably long induction period of several hours (see Comparative Example 6).

We found that the timing of applying the added inert gas pressure is not crucial. For instance, the pressure can be applied before (see Example 2) or after (see Example 1) heating the aqueous mixture of NVP to the intial reaction temperature of 130–150° C. Either way, the product is easy to isolate and has a desirably low swell volume.

Step Two: Polymerization.

In the second step, the reactor temperature is reduced to a value within the range of about 95° C. to about 105° C., more preferably at about 100° C., to initiate polymerization of the remaining N-vinylpyrrolidone. Normally, the temperature is allowed to drop to the 95–105° C. range, and is then regulated at that temperature with heating or cooling as needed. Usually, an exotherm occurs immediately or soon after the temperature is dropped to the 95–105° C. range, indicating that polymerization is underway. The reaction mixture is held at 95–105° C. until most of the NVP polymerizes. The reaction is normally complete within about 5–6 hours.

After the polymerization is complete, the crosslinked PVP is isolated by any suitable technique. Usually, water is added, the mixture is stirred for awhile, and the aqueous phase is separated from the polymer by decanting, filtering, or the like. The polymer is preferably washed with additional water to remove residual alkali metal hydroxide. If desired, the pH of the washings can be monitored until a neutral filtrate is observed. The polymer is then normally dried at room or elevated temperature under atmospheric or reduced pressure. Preferably, elevated temperature and reduced pressure are used to drive off the residual water.

Crosslinked PVP prepared by the process of the invention has a relatively low swell volume. In particular, it has a swell volume less than about 40 mL $H_2O$/10 g polymer. Preferably, the PVP-P has a swell volume within the range of about 34 to about 36 mL $H_2O$/10 g polymer. Crosslinked PVP having a swell volume less than about 40 mL $H_2O$/10 g polymer is valuable for applications that require limited swelling of the polymer. While some adsorptivity is needed, too much adsorption can result in disintegration of the polymer. Disintegration is desirable for pharmaceutical tablets, but it is undesirable in beverage clarification, where a solid filter cake needs to remain intact during the beverage filtering process to prevent impurity breakthrough. Moreover, PVP-P having limited swell volume minimizes the volume of solid filter cake generated, thereby reducing waste disposal costs.

Crosslinked PVP produced using the process of the invention preferably has a particle size within the range of about 250 to about 350 microns. It preferably has a glass-transition temperature (Tg), measured by differential scanning calorimetry, within the range of about 185° C. to about 190° C.; more preferably, the Tg is about 185° C.

The following examples merely illustrate the invention. Those skilled in the art will recognize many variations that are within the spirit of the invention and scope of the claims.

EXAMPLE 1

Preparation of Crosslinked Polyvinylpyrrolidone

Step 1: A 600-mL Parr reactor equipped with a heating mantle, overhead stirrer, thermocouple, nitrogen inlet, and pressure gauge is charged with N-vinylpyrrolidone (81.6 g), water (43.9 g), and aqueous sodium hydroxide (4.1 g of 20% aq. NaOH). This corresponds to 65 wt. % NVP based on the total amount of water+NVP, and 2.8 mole % (1.0 wt. %) of sodium hydroxide based on the amount of NVP used. The reactor is purged with nitrogen, pressurized to 2 psig, and stirring begins. When the reactor temperature reaches 140° C., the pressure reads 48 psig. The reactor pressure is then raised to 60 psig by adding more nitrogen. The reaction temperature is held at 140° C. for 5 h to generate a crosslinker in situ.

Step 2: The reaction mixture is allowed to cool to 100° C., and the pressure drops to 30 psig. A slight exotherm is observed immediately (indicating no significant induction period), and the reactor is held at 100° C. for 5 h to complete the polymerization. The product is filtered, washed with water (1000 mL), and dried (100° C., 24 h) under vacuum (1–2 mm Hg). The product is ground to a fine powder using a mortar and pestle. The resulting polyvinylpyrrolidone powder has a swell volume of 36 mL $H_2O$/10 g polymer.

Procedure used to measure swell volume (all PVP-P samples):

A 100-mL graduated cylinder is charged with 10–15 mL of water. Ten grams of dry PVP-P powder are added, followed by more water. The suspension is stirred rapidly and is then diluted to the 100-mL mark with water. The mixture stands overnight at room temperature. The volume of solids is determined by inspection of the cylinder.

EXAMPLE 2

Effect of Increasing Pressure at the Start of Step One

The procedure of Example 1 is generally followed, except that the initial reactor pressure is increased from 2 psig to 12 psig. When the reactor temperature reaches 140° C. during Step 1, the pressure reads 60 psig. No additional nitrogen pressure is added thereafter. A slight exotherm is observed immediately after decreasing the reaction temperature to 100° C. at the start of Step 2. The resulting polyvinylpyrrolidone has a swell volume of 35 mL $H_2O$/10 g polymer.

Examples 1 and 2 demonstrate that the required pressure can be applied either before or after the initial heating step; in either case, the result is rapid production of an easily isolated polymer having low swell volume.

COMPARATIVE EXAMPLE 3

Effect of Decreasing N-Vinylpyrrolidone Concentration

The procedure of Example 1 is repeated, except that 75.3 g of N-vinylpyrrolidone and 50.2 g of water are used. This corresponds to an initial charge of 60 wt. % NVP. A slight exotherm is detected, but only after heating the reaction mixture for about 5 hours at 100° C. in Step 2. The resulting polyvinylpyrrolidone has a swell volume of 34 mL $H_2O$/10 g polymer.

This example demonstrates that the use of an NVP concentration significantly lower than about 65 wt. % results in an undesirably long induction period.

COMPARATIVE EXAMPLE 4

Effect of Further Decreasing N-Vinylpyrrolidone Concentration

The procedure of Example 1 is generally followed, except that 69.0 g of N-vinylpyrrolidone and 56.5 g of water are used. This corresponds to an initial charge of 55 wt. % NVP. After heating for about 5 h at 100° C. in Step 2, no polymer is obtained.

This example and Comparative Example 3 show the importance of using at least about 65 wt. % of N-vinylpyrrolidone.

COMPARATIVE EXAMPLE 5

Effect of Decreasing the NaOH Concentration

The procedure of Example 1 is generally followed, except that the sodium hydroxide level is reduced from 2.8 mole % (1.0 wt. %) to 1.4 mole % (0.5 wt. %) based on the amount of NVP charged. A slight exotherm is observed immediately upon dropping the reaction temperature to 100° C. at the start of Step 2. The swell volume of the resulting polyvinylpyrrolidone is relatively high at 50 mL $H_2O$/10 g polymer.

This example shows the importance of using more than 1.4 mole % of the alkali metal hydroxide. With only 1.4 mole % NaOH, the polymer swell volume is significantly greater than 40 mL $H_2O$/10 g polymer.

COMPARATIVE EXAMPLE 6

Effect of Omitting Nitrogen Pressure

The procedure of Example 1 is followed, except that no initial nitrogen pressure (instead of 2 psig) is applied at the start of Step 1. When the reaction temperature reaches 140° C., the reactor pressure reaches its maximum value of 50 psig. No additional nitrogen is added thereafter. A slight exotherm is detected after 3 hours of heating at 100° C. in Step 2. The resulting polyvinylpyrrolidone has a swell volume of 40 mL $H_2O$/10 g polymer.

This example shows the importance of applied pressure. Without it, the maximum reactor pressure is below 55 psig, and a 3-hour induction period results.

COMPARATIVE EXAMPLE 7

Effect of Higher N-Vinylpyrrolidone Concentration

The procedure of Example 1 is modified to resemble the process disclosed in PCT Int. Appl. No. WO 94/20555. Thus, the 600-mL Parr reactor equipped as described earlier is charged with N-vinylpyrrolidone (103 g, 82 wt. % based on the total amount of water +NVP), water (22.5 g), and aqueous sodium hydroxide (1.6 mole % based on NVP charged). The reactor is purged with nitrogen, pressurized to 35 psig, and stirring begins. When the reactor temperature reaches 140° C., the pressure reads 80 psig. No additional nitrogen is added. The reaction temperature is held at 140° C. for 3 h to generate a crosslinker in situ.

The reaction mixture is allowed to cool to 100° C. A slight exotherm is observed within 15 minutes, and the reactor is held at 100° C. for 2 h to complete the polymerization. The resulting polyvinylpyrrolidone has a relatively high swell volume of 64 mL $H_2O$/10 g polymer.

This example and Comparative Example 8 below show that applying nitrogen pressure helps to eliminate the induction period. However, when the initial concentration of N-vinylpyrrolidone is high (here, 82%), the resulting polymer has a swell volume that is significantly higher than 40 mL H$_2$O/10 g polymer.

COMPARATIVE EXAMPLE 8

Effect of Higher N-Vinylpyrrolidone Concentration

The procedure of Comparative Example 7 is followed, except that the catalyst level is increased from 1.6 mole % to 2.1 mole % based on NVP charged. When the reactor temperature reaches 140° C., the pressure reads 85 psig. No additional nitrogen is added. The reaction temperature is held at 140° C. for 3 h to generate a crosslinker in situ. The reaction mixture is allowed to cool to 100° C. An exotherm is observed immediately, and the reactor is held at 100° C. for 1.5 h to complete the polymerization. The resulting polyvinylpyrrolidone has a relatively high swell volume of 50 mL H$_2$O/10 g polymer.

COMPARATIVE EXAMPLE 9

Effect of Omitting Nitrogen Pressure

The procedure of U.S. Pat. No. 3,277,066 is generally followed. Thus, the 600-mL Parr reactor equipped as described in Example 1 is charged with N-vinylpyrrolidone (96.6 g, 77 wt. % based on the total amount of water +NVP), water (28.9 g), and aqueous sodium hydroxide (5.6 mole % based on NVP charged). The reactor is purged with nitrogen, sealed, and stirring begins at atmospheric pressure. When the reactor temperature reaches 130° C., the pressure reads 32 psig. No additional nitrogen is added. The reaction temperature is held at 130° C. for 2 h, and then the reaction mixture is allowed to cool to 100° C. No exotherm is observed, and after stirring for 30 minutes, no polymer is isolated.

Table 1 summarizes the results from Examples 1–2 and Comparative Examples 3–8.

TABLE 1

Preparation of Crosslinked Polyvinylpyrrolidone

| | Example | | | | | | | |
|---|---|---|---|---|---|---|---|---|
| | 1 | 2 | C3 | C4 | C5 | C6 | C7 | C8 |
| Initial conc. NVP (%) | 65 | 65 | 60 | 55 | 65 | 65 | 82 | 82 |
| NaOH (mole %) | 2.8 | 2.8 | 2.8 | 2.8 | 1.4 | 2.8 | 1.6 | 2.1 |
| Step 1 temp (° C.) | 140 | 140 | 140 | 140 | 140 | 140 | 140 | 140 |
| Step 2 temp (° C.) | 100 | 100 | 100 | 100 | 100 | 100 | 100 | 100 |
| Initial pressure (psig) | 2 | 12 | 2 | 2 | 2 | 0 | 35 | 35 |
| Step 1 pressure (psig) | 48 | 60 | 48 | 48 | 50 | 0 | 80 | 85 |
| Max. pressure (psig) | 60 | 60 | 60 | 60 | 60 | 50 | 80 | 85 |
| Hold time, step 1 (h) | 5 | 5 | 5 | 5 | 5 | 5 | 3 | 3 |
| Induction period (h) | 0 | 0 | 5 | — | 0 | 3 | 0 | 0 |
| Hold time, step 2 (h) | 5 | 5 | 5 | 5 | 5 | 5 | 2 | 1.5 |
| Polymer obtained? | yes | yes | yes | no | yes | yes | yes | yes |
| Swell volume (mL H$_2$O/10 g polym.) | 36 | 35 | 34 | — | 50 | 40 | 64 | 50 |

The preceding examples are meant only as illustrations. The following claims define the invention.

We claim:

1. A process which comprises:

(a) heating an aqueous mixture that contains from about 65 to about 70 wt. % of N-vinylpyrrolidone and from about 1.5 to about 6.0 mole %, based on the amount of N-vinylpyrrolidone, of an alkali metal hydroxide under added inert gas pressure in a sealed reactor to a temperature within the range of about 130° C. to about 150° C. at an ultimate reactor pressure of at least about 55 psig to generate a crosslinker; and (b) reducing the reactor temperature to a value within the range of about 95° C. to about 105° C. to initiate polymerization and produce crosslinked polyvinylpyrrolidone having a swell volume less than about 40 mL H$_2$O/10 g polymer.

2. The process of claim 1 wherein the amount of alkali metal hydroxide used is from about 2.0 to about 4.0 mole % based on the amount of N-vinylpyrrolidone.

3. The process of claim 1 wherein the alkali metal hydroxide is sodium hydroxide.

4. The process of claim 3 wherein about 2.8 mole % of sodium hydroxide, based on the amount of N-vinylpyrrolidone, is used.

5. The process of claim 1 wherein step (a) is performed at a temperature of about 140° C.

6. The process of claim 1 wherein the added inert gas pressure is applied before heating the aqueous mixture to said temperature in step (a).

7. The process of claim 1 wherein the added inert gas pressure is applied after heating the aqueous mixture to said temperature in step (a).

8. The process of claim 1 wherein the ultimate reactor pressure is within the range of about 60 psig to about 100 psig.

9. The process of claim 1 wherein the reactor temperature in step (b) is about 100° C.

10. The process of claim 1 wherein the crosslinked polyvinylpyrrolidone has a swell volume within the range of about 34 to about 36 mL H$_2$O/10 g polymer.

11. A process which comprises:

(a) heating an aqueous mixture that contains from about 65 to about 70 wt. % of N-vinylpyrrolidone and from about 2.0 to about 4.0 mole %, based on the amount of N-vinylpyrrolidone, of sodium hydroxide under added inert gas pressure in a sealed reactor to a temperature within the range of about 130° C. to about 150° C. at an ultimate reactor pressure of at least about 55 psig to generate a crosslinker; and (b) reducing the reactor temperature to a value within the range of about 95° C. to about 105° C. to initiate polymerization and produce crosslinked polyvinylpyrrolidone having a swell volume less than about 40 mL $H_2O$/10 g polymer.

12. The process of claim 11 wherein about 2.8 mole % of sodium hydroxide, based on the amount of N-vinylpyrrolidone, is used.

13. The process of claim 11 wherein step (a) is performed at a temperature of about 140° C.

14. The process of claim 11 wherein the added inert gas pressure is applied before heating the aqueous mixture to said temperature in step (a).

15. The process of claim 11 wherein the added inert gas pressure is applied after heating the aqueous mixture to said temperature in step (a).

16. The process of claim 11 wherein the ultimate reactor pressure is within the range of about 60 psig to about 100 psig.

17. The process of claim 11 wherein the reactor temperature in step (b) is about 100° C.

18. The process of claim 11 wherein the crosslinked polyvinylpyrrolidone has a swell volume within the range of about 34 to about 36 mL $H_2O$/10 g polymer.

* * * * *